No. 648,774. Patented May 1, 1900.
R. E. MUNRO.
REDUCING TANK FOR MAKING FERTILIZERS.
(Application filed Sept. 9, 1899.)
(No Model.)
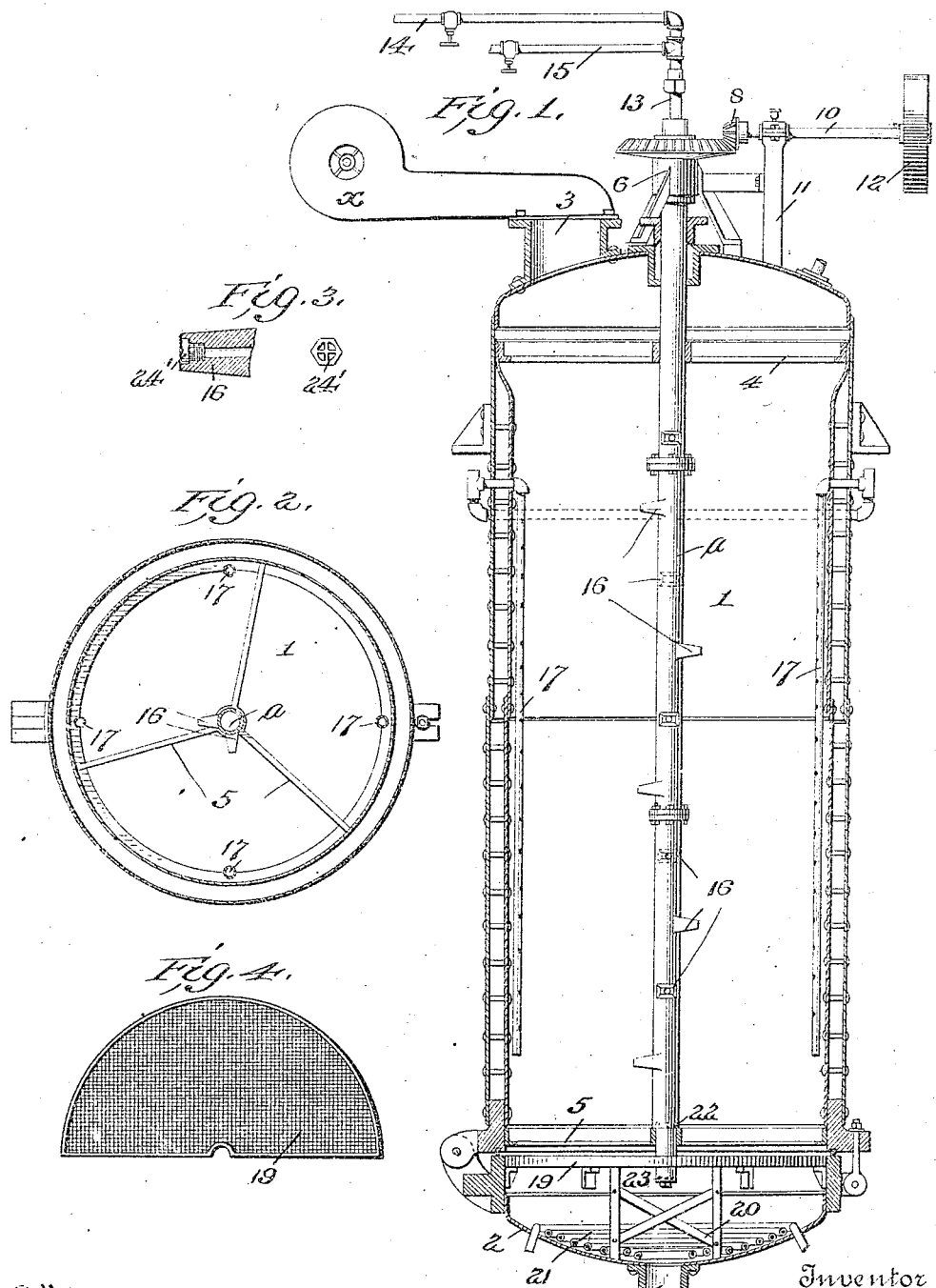
Witnesses
F. L. Middleton
C. Middleton
Inventor
Robert E. Munro
by
Attorney

United States Patent Office.

ROBERT E. MUNRO, OF BALTIMORE, MARYLAND.

REDUCING-TANK FOR MAKING FERTILIZERS

SPECIFICATION forming part of Letters Patent No. 648,774, dated May 1, 1900.

Application filed September 9, 1899. Serial No. 729,976. (No model.)

*To all whom it may concern:*

Be it known that I, ROBERT E. MUNRO, a citizen of the United States, residing at No. 610 Chestnut Hill avenue, Baltimore, Maryland, have invented certain new and useful Improvements in Reducing-Tanks, of which the following is a specification.

My invention relates to reducing-tanks for certain substances used in the manufacture of fertilizers. The materials used for this purpose are hair, leather scraps, and the like; but I do not limit myself in the use of the tank to any special material, as it is well adapted for use in the reduction of many other materials.

In the process of manufacture the substance to be treated is placed in a hermetically-sealed tank and processed to destroy its organic texture, sufficient moisture being maintained to produce a satisfactory product. It is quite necessary that all the material to be reduced be subjected to a uniform treatment; and to attain this to the greatest degree is the primary object of the present invention. In tanks adapted for this purpose now in use the steam for treating the material is introduced from the bottom and passes upwardly through the material; but the thorough permeation of the substances cannot be secured in this manner, as the material near the bottom of the tank is subjected to a greater amount of steam than that at the top, causing a variation in the product.

The present invention includes a tank having a steam-distributing pipe extending longitudinally and centrally of the material-chamber and provided with spirally-arranged laterally - extending distributing - nozzles, means being provided for rotating the pipe.

The invention also includes the details of construction to be hereinafter described, and particularly pointed out in the claims.

The invention is illustrated in the accompanying drawings, in which—

Figure 1 is a longitudinal sectional view of the apparatus, and Figs. 2, 3, and 4 are detail views.

The tank proper, 1, is provided with double side walls and a hinged bottom 2. A stockhole 3 in the top of the tank permits the introduction of material in filling the tank. Throughout the length of the material-chamber a pipe *a* extends, journaled in brackets 4 5, fitted in the upper and lower ends of the chamber. This pipe also passes through a suitable stuffing-box in the head of the tank and is mounted at its upper end in a bracket 6, supported upon the tank-head. Above this bracket a beveled gear is secured, driven by a suitable pinion 8, carried by a spindle 10, supported in a bracket 11 and driven by a pulley 12 from any suitable source of power. A combined water and steam pipe 13 leads into the end of the pipe *a*, a branch pipe 14 leading from the pipe 13 to the steam-supply and a similar pipe 15 leading from the same to the water-supply. Spirally arranged throughout the length of the pipe *a* are a series of laterally-extending discharge-nozzles 16 for supplying the steam and water to the material in the tank. Along the side walls of the tank, suitably spaced apart, perforated pipes 17 are located, four of these pipes being shown. The upper ends of these pipes extend outside the tank and are suitably connected to the steam and water supply.

The lower end of the pipe *a* is slightly reduced and projects below the end of the material-chamber into the hinged section 2 when said section is closed. Upon a flange or lug secured near the upper edge of this section 2 a screen 19 for supporting the material to be treated rests. This screen is formed in two sections, each section having a semicircular recess centrally thereof to accommodate the extension of the pipe *a*. A frame 20 may also be provided for supporting the intermediate part of the screen, the legs thereof resting on the bottom of the hinged section. In treating the material after the tank is filled steam is fed through the pipes, the pipe *a* being rotated. The nozzles will effectually serve to distribute the steam to the material throughout the length of the tank and to keep the same from packing at the center. The pipes arranged along the wall of the tank also serve to direct the steam to the material near the same which would not otherwise be thoroughly treated.

If the raw material is found to be too dry, water may be introduced through the pipes until the proper moisture is obtained. A coil of heating-pipe 21 may be located in the bottom of the hinged section and the latter filled by admitting water thereto through perforations 22 23 in the lower end of the pipe a. The steam arising from the water will assist in the thorough treatment of the material, and the coil may also be used to heat the air admitted at the bottom.

After the material has been subjected to the steam heat for a sufficient length of time the excess of moisture is extracted therefrom and the material partially dried by means of the admission of hot air at the bottom and the application of an exhaust-fan x at the stock-hole.

To prevent the material under treatment from choking the nozzles, hollow screw-nipples 24 may be fitted in the same, having their discharge-openings divided by cross-partitions.

The material under treatment packs very closely as it disintegrates, and in order to distribute the steam and prevent too close packing I use the rotating shaft, with the spirally-arranged nozzles, which project slightly from the plane of the shaft and sufficiently to inject the steam into the mass from the perforated ends. The resistance offered to these nozzles is so great that it is necessary to make them comparatively short, as otherwise they would break off, and I have also found it necessary to make these nozzles integral with the shaft, as no amount of clamping is able to resist the pressure, and hence I have not been able to make them separate and independent. These nozzles are of such width at front and back as to have the effect of loosening the material as they move through the mass, and as the openings or perforations are in the extreme ends of the nozzles the full effect of the discharging-jets is secured.

I am aware that it has been proposed prior to my invention to use a rotating shaft with a series of agitating-blades projecting therefrom and having perforations; but it would not be possible to use such a construction for the purpose of my invention, as it would not be possible to rotate the shaft with agitators of any extent, and if force sufficient were applied the agitators would be broken off. It has also been proposed in the treatment of fish to provide a cylinder with a rotating shaft having a series of cutting-knives carried thereby, the knives having perforations on their back edges. Such a construction would in connection with my invention tend to pack the material instead of loosen it, while the jets of steam would be confined to a circular zone immediately around the shaft and would not be distributed throughout the mass, as in my invention, where the jets are discharged from the ends of the projections or nozzles and practically radially of the shaft.

I claim—

1. In combination the tank having the stockhole in the top thereof for the insertion of the material, a hinged bottom section adapted to facilitate the discharge of the material, a stirrer within the tank provided with a series of nozzles having discharge-openings for agitating the material and an exhaust-fan for drying the material, substantially as described.

2. In combination a tank, a pipe extending axially thereof, the nozzles projecting therefrom, perforations in the ends of the nozzles, and hollow screw-nipples fitted to the ends of said nozzles, substantially as described.

In testimony whereof I affix my signature in presence of two witnesses.

ROBERT E. MUNRO.

Witnesses:
HENRY E. COOPER,
C. S. MIDDLETON.